United States Patent

Matouka

[15] 3,697,782

[45] Oct. 10, 1972

[54] TWO-STATE ZERO-CROSSING DETECTOR

[72] Inventor: Michael F. Matouka, Sterling Heights, Mich.

[73] Assignee: General Motors Corporation, Detroit, Mich.

[22] Filed: Sept. 20, 1971

[21] Appl. No.: 182,003

[52] U.S. Cl. ..................307/235, 307/236, 328/118, 328/150

[51] Int. Cl. ..............................................H03k 5/20

[58] Field of Search .......307/235, 236; 328/118, 150

[56] References Cited

UNITED STATES PATENTS

| | | | |
|---|---|---|---|
| 3,509,372 | 4/1970 | Bicking | 307/235 X |
| 3,571,621 | 3/1971 | Hart et al. | 307/236 X |

*Primary Examiner*—John Zazworsky
*Attorney*—E. W. Christen et al.

[57] ABSTRACT

A comparator having two output states and two input connections is used to develop an indication of the polarity of an alternating voltage. The comparator output is coupled with one of two inputs of the comparator. Two voltage controlled switches including opposite conductivity type transistors and oppositely poled diodes are connected such that the voltage being sensed is applied to the second input to the comparator when it changes polarity, thereby changing the state of the comparator output. Control of the switches in accordance with the comparator output and the sensed voltage provides a disconnect feature whereby the detector draws power from the sensed voltage only during switching intervals; no power is drawn after a change in polarity by the sensed voltage until it again reverses its polarity.

3 Claims, 3 Drawing Figures

PATENTED OCT 10 1972 3,697,782

INVENTOR.
Michael F. Matouka
BY
C. L. Melaud
ATTORNEY

TWO-STATE ZERO-CROSSING DETECTOR

This invention relates to a zero-crossing detector providing an indication of the polarity of a sensed voltage and in particular to such a detector including a disconnect feature whereby the detector draws power from the sensed voltage source only during switching intervals.

A voltage comparator is used in the present zero-crossing detector to provide an output signal controlled by the polarity of a sensed voltage. Two opposite conductivity type transistors and two oppositely poled diodes comprise two voltage controlled switches controlled by the sensed voltage and the comparator output to connect a voltage input to the comparator to change its output state each time the sensed voltage reverses polarity. After the comparator changes its output state, the conducting transistor-diode switch open circuits disconnecting the sensed voltage from the comparator, thus reducing signal power drawn by the detector from the sensed voltage to zero.

The present invention draws no power from the input sensed voltage except during the time the comparator is changing state. Thus, the detector draws no more power when connected to sense the zero-crossing of a 20volt peak-to-peak sine wave input than when connected to sense the zero-crossing of a 1,000 volt peak-to-peak sine wave input. With the disconnect feature of this invention, the zero-crossing detector can use low impedance components to reduce noise effects without dissipating more than a minimum of input power.

It is an object of the present invention to provide a two-state, zero-crossing detector having an output state, controlled by the polarity of an input voltage, changing state on the occasion of a reversal of the input voltage polarity wherein the detector is disconnected from the input voltage by a switching arrangement at all times other than during switching intervals.

Another object of the present invention is to provide a circuit providing a two-state output for sensing voltage polarity changes including a comparator and first and second voltage controlled switches wherein the sensed voltage is connected through one of the switches on the occurrence of each reversal of polarity by the sensed voltage, thereby applying voltage to the input of the comparator to reverse the state of the comparator output.

Another object of the present invention is to provide a circuit for sensing voltage polarity changes wherein a voltage comparator having a two-state output is switched when the sensed voltage reverses polarity by connecting the sensed voltage through a transistor coupled with and controlled by the output of the comparator and a diode poled such that the switch connects the sensed voltage with the comparator and wherein the transistor is rendered nonconductive when the comparator changes state to thereby disconnect that switch from the sensed voltage and wherein a second switch functioning in an analogous manner operates when the sensed voltage next subsequently reverses polarity, the comparator being disconnected from the senses voltage by the switches except during switching internals.

These and other objects and advantages of the present invention will become more readily apparent as reference is had to the accompanying specification and drawings wherein.

Figure 1:
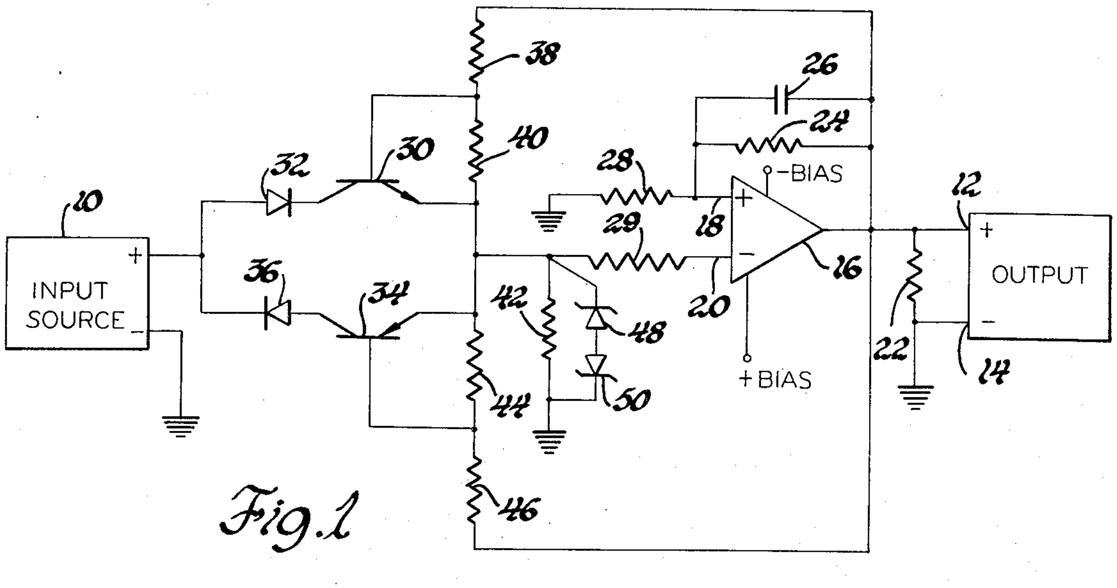
FIG. 1 is a circuit schematic of the zero-crossing detector of the present invention.
Figure 2:
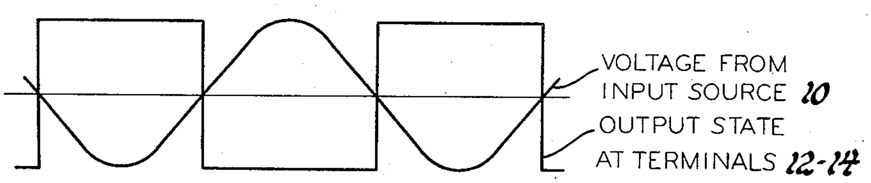
FIG. 2 is a graph showing a sensed sine wave and the output state of the zero-crossing detector of FIG. 1 associated with the sensed sine wave.

Reference should now be made to FIG. 1, a circuit schematic of the zero-crossing detector of this invention. An input voltage for sensing by the detector is provided by an input source of sinusoidal voltage 10, and an output state is developed across terminals 12 and 14 in accordance with the polarity of the sensed input voltage. FIG. 2 depicts the sine wave supplied by the input source 10 and the concomitant output state at the terminals 12 and 14.

In the detector of FIG. 1, an operational amplifier 16 having first and second input terminals 18 and 20 provides an output across a resistor 22 for connection with the output terminals 12 and 14, having an output state determined by the relative polarity of the voltages applied to terminals 18 and 20. The operational amplifier 16 operates as a voltage comparator providing an output voltage controlled by the two input voltages connected with the terminals 18 and 20. When the polarity at terminal 18 is positive with respect to the polarity at terminal 20, the output from the operational amplifier 16 is at its positive or high state; when the polarity at terminal 20 is positive with respect to the polarity at terminal 18, the output from the operational amplifier 16 is at its negative or low state. Positive and negative bias are connected with the differential amplifier as shown in the schematic; the requisite bias sources are common in the art and are neither shown nor described in detail.

The input terminals 18 and 20 are coupled respectively with the output of the operational amplifier 16 and the sensed voltage from the source 10 to control the output state of the operational amplifier and to change the output state on the occasion of each change in polarity by the sensed input voltage. A resistor 24 and a capacitor 26 couple the output with the input terminal 18. A resistor 28 coacts with this feedback connection of resistor 24 and capacitor 26 to calibrate the voltage at terminal 18. Two voltage controlled switches responsive to the polarities of the sensed input voltage and the operational amplifier output voltage couple the input voltage through a resistor 29 with terminal 20.

First and second voltage controlled switches comprising respectively an NPN transistor 30 and a diode 32 and a PNP transistor 34 and a diode 36 provide the interconnection between the input source 10 and the terminal 20 of the operational amplifier. A resistive network including resistors 38, 40, and 42 connects the output from the amplifier 16 as a control bias to the base-emitter control circuit of transistor 30 to control the conductive state of the collector-emitter circuit of that transistor. A resistive network including resistors 42, 44, and 46 connects the output from the amplifier 16 with the transistor 34 to similarly control its conductive state. Zener diodes 48 and 50 prevent the voltage to the input terminal 20 from exceeding a preselected maximum.

In operation, the output of the amplifier 16 sets the polarity of the voltage at the input terminal 18 and determines the conductive state of both the transistors 30 and 34. Inasmuch as the transistors are of opposite conductivity types, one is conductive and one is nonconductive in its collector-emitter circuit for each output polarity for the amplifier 16. Each change in output polarity by the amplifier 16 causes a change in the conductive states of the transistors 30 and 34, rendering one conductive and the other nonconductive according to the applied bias and the conductivity type, NPN or PNP, of the respective transistors.

Since diodes 32 and 36 are oppositely poled, the input sinusoid from the source 10 is blocked by one of the diodes 32 or 36 and passed by the other diode to its associated transistor 30 or 34 for each polarity of the input sinusoid. Each zero-crossing of the input sinusoid results in a reversal of the blocking or conducting conditions of the two diodes.

Consideration of the two voltage controlled switches and the coaction of their respective diodes and transistors reveals the essence of the present invention. Each of the switches is controlled jointly by the sensed input voltage and the comparator or amplifier output voltage such that it is conductive only on the occurrence of a respective predetermined combination of the two voltage polarities. In this manner, the output at terminals 12 and 14 is positive or negative depending on the polarity of the sensed voltage. Additionally, the two voltage controlled switches isolate the comparator from the sensed voltage except during switching intervals; no power is required from the sensed voltage except during switching of the output state in response to a change in polarity. This last feature allows a 1,000 volt peak-to-peak input voltage to be sensed without any more loading of the source than for a 20 volt peak-to-peak voltage.

In operation, when the input sinusoid is negative, diode 36 is forward biased and diode 32 is reverse biased. As shown in FIG. 2, the output state of amplifier 16 is positive during those internals in which the sensed sinusoid is negative. Accordingly, transistor 30 is biased conductive and transistor 34 is biased off. However, during steady state, it should be appreciated that both the voltage controlled switches are open since the diode 32 is reverse biased though the transistor 30 is biased conductive and the transistor 34 is biased off though the diode 36 is forward biased.

When the input sinusoid passes through zero and assumes a positive level, diode 32 will be biased on and diode 36 off, whereas transistor 30 remains conductive and transistor 34 off since the output state of amplifier 16 has not yet changed. In accordance with the polarity reversal by the input voltage, the voltage controlled switch including diode 32 and transistor 30 conducts applying the input voltage to the terminal 20 through the diode 32, the collector-emitter circuit of the transistor 30, and the resistor 29. When this positive voltage at terminal 20 exceeds the positive voltage connected at terminal 18, the amplifier reverses the polarity of its output providing a negative output between terminals 12 and 14. This negative output renders transistor 30 nonconductive, opens the switch including diode 32 and transistor 30, and disconnects the detector from the input source 10. Transistor 34 is biased conductive by the negative output voltage from the amplifier 10; however, diode 36 is reverse biased preventing the input source from being connected with the detector through the voltage controlled switch including transistor 34 and diode 36.

It should be understood that some leakage current flows through a reverse biased diode or a transistor biased to shut off. Thus, the detector draws leakage current from the source 10 during quiescent periods. This leakage current is negligible and, accordingly, the detector is described as drawing zero current during quiescent periods.

Until the subsequent reversal of polarity, the voltage from source 10 remains positive and the output from the amplifier 16 remains negative. It should be understood that the voltage divider comprising resistors 38, 40, 42, 44, and 46 providing a measure of the output to terminal 20 during the quiescent period has an amplitude less than the amplitude connected with terminal 18, thus providing a sustaining voltage differential for the amplifier 16.

On the next subsequent polarity reversal by the voltage from source 10, the sinusoid proceeds in a negative going direction connecting increasing amplitude negative voltage to terminal 20 through diode 36, transistor 34, and resistor 29 from the source 10. When the input amplitude connected with terminal 20 exceeds the amplitude at terminal 18, the differential input to amplifier 16 is such that terminal 18 is positive with respect to terminal 20 changing the state of the output to its positive potential polarity. This positive output biases transistor 30 conductive and transistor 34 non-conductive completing one full cycle of operation. In a manner similar to that stated with regard to the negative output state from the amplifier 16, the voltage at input terminal 20 during the subsequent quiescent period has a lower value than that at terminal 18, thus sustaining the positive output state throughout the quiescent period. After the change in state, both switches are open as transistor 34 is biased nonconductive and diode 32 is reverse biased. The described operation repeats for each reversal of polarity by the sensed input voltage.

Figure 3:
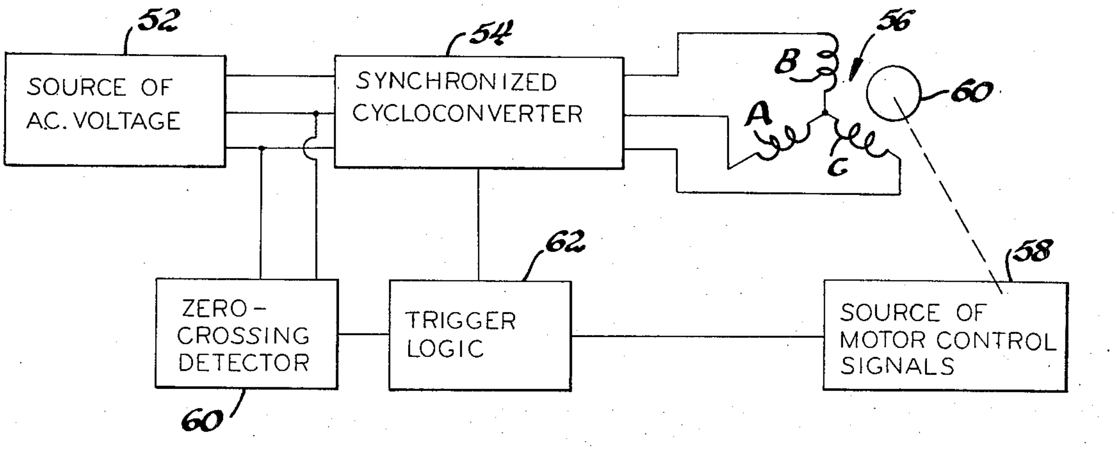
FIG. 3 is a circuit schematic, partially in block form, showing a slip speed control for an induction motor incorporating the zero-crossing detector of the present invention to develop trigger signals synchronized with AC source voltages.

Reference should now be made to FIG. 3 wherein a synchronized cycloconverter induction motor control system is shown primarily in block form. A source of AC voltage 52 provides a three-phase AC input to a controlled rectifier synchronized cycloconverter 54 which transforms the input voltage to a controlled slip frequency supply for the windings A, B, and C of an induction motor 56. The voltage from source 52 has a constant frequency and a constant amplitude whereas the voltage supplied windings A, B, and C can have a controlled amplitude and frequency. The rotor 60 is coupled with a source of motor control signals 58 to develop a control signal correlated with the operating speed of the induction motor. The zero-crossing detector of the present invention is shown as block 60 connected with the voltage lines of the source 52. The zero-crossing detector develops a control signal synchronized with the AC supply voltage supplied the cycloconverter. The control signals from the zero-crossing detector 60 and the source of motor control signals 58 are combined in a trigger logic 62 which regulates the conductive states of the controlled rectifiers in the cycloconverter 54. All of the foregoing regarding the motor control system is know in the art of induction motor control and described in U.S. Pat. No.

3,332,002 Jollois. The present invention is useful in the motor control system for generating control signals in synchronism with the AC supply voltage.

The zero-crossing detector of the present invention affords an efficient and effective control developing a signal correlated with the polarity of a sensed voltage without loading the sensed voltage source and dissipating excess power. The disconnect feature of the input voltage controlled switches affords this operational advantage.

Although the foregoing has proceeded in terms of a preferred embodiment, it should be understood that various changes and modifications could be engrafted thereon by one skilled in the art within the spirit and scope of the appended claims.

I claim:

1. A circuit for sensing voltage polarity changes and providing an indication thereof, comprising: a voltage comparator having first and second inputs and providing an output having a polarity determined by the relative polarity of the voltages connected at the inputs of said comparator; means coupling said output with said first input; first and second voltage controlled switches, each of said switches being coupled with the output of said comparator and adapted to be connected with the voltage being sensed, each of said switches being responsive to the polarities of both the comparator output voltage and the sensed voltage, and each of said switches being conductive only on the occasion of a respective predetermined combination of the two voltage polarities connected with it; and means for coupling both of said switches with said second input of said comparator such that on the occasion of each change in polarity by the voltage being sensed, one of said switches conducts applying voltage to the second input of said comparator reversing the polarity of the comparator output indicating a reversal of the sensed voltage polarity.

2. A circuit for sensing voltage polarity changes and providing an indication thereof, comprising: a voltage comparator having first and second inputs and providing an output having a polarity determined by the relative polarity of the voltages connected at the inputs of said comparator; means coupling said output with said first input; first and second voltage controlled switches, each of said switches including a transistor coupled with and controlled by the output of said comparator and a diode adapted to be connected with the voltage being sensed, said switches having transistors of opposite conductivity types and diodes poled such that each of said switches is conductive only on the occasion of a respective predetermined combination of the two voltage polarities connected with its diode and transistor; and means for coupling both of said switches with said second input of said comparator such that on the occasion of each change in polarity by the voltage being sensed, one of said switches conducts applying voltage to the second input of said comparator reversing the polarity of the comparator output indicating a reversal of the sensed voltage polarity.

3. A circuit for sensing voltage polarity changes and providing an indication thereof, comprising: a voltage comparator having first and second inputs and providing an output having a polarity determined by the relative polarity of the voltages connected at the inputs of said comparator; means coupling said output with said first input; first and second transistors of opposite conductivity types, each of said transistors having its base-emitter control circuit coupled with said comparator output such that conduction from collector to emitter for each transistor is controlled in accordance with the output of said comparator, one of said transistors being biased conductive in its collector-emitter circuit and the other nonconductive for each output polarity of said comparator; first and second diodes adapted for interconnecting said transistors with the voltage to be sensed, said diodes being poled such that one is forward biased and the other reverse biased for each input polarity; and means for coupling both of said transistors with said second input of said comparator such that on the occasion of each change in polarity by the voltage being sensed, the sensed voltage is connected through a respective diode and a respective transistor with said second input of said comparator reversing the polarity of the comparator output indicating a reversal of the sensed voltage polarity.

* * * * *